(12) United States Patent
Terkowitz et al.

(10) Patent No.: US 12,438,942 B2
(45) Date of Patent: Oct. 7, 2025

(54) ACCESS MANAGEMENT FOR A MULTI-ENDPOINT DATA STORE

(71) Applicant: Amazon Technologies, Inc., Seattle, WA (US)

(72) Inventors: Michael Sturgis Terkowitz, Seattle, WA (US); Seema Pradeep Degwekar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 32 days.

(21) Appl. No.: 17/687,465

(22) Filed: Mar. 4, 2022

(65) Prior Publication Data

US 2022/0191104 A1    Jun. 16, 2022

Related U.S. Application Data

(62) Division of application No. 15/621,957, filed on Jun. 13, 2017, now Pat. No. 11,271,815.

(51) Int. Cl.
  *H04L 67/1097* (2022.01)
  *G06F 16/27* (2019.01)
  *G06F 16/951* (2019.01)

(52) U.S. Cl.
  CPC .......... *H04L 67/1097* (2013.01); *G06F 16/27* (2019.01); *G06F 16/951* (2019.01)

(58) Field of Classification Search
  CPC ...... H04L 41/12; H04L 67/1097; H04L 67/01
  See application file for complete search history.

(56) References Cited

U.S. PATENT DOCUMENTS

| | | | |
|---|---|---|---|
| 6,026,405 A | 2/2000 | Arda et al. | |
| 6,338,059 B1 | 1/2002 | Fields | |
| 7,047,315 B1 | 5/2006 | Srivastava | |
| 7,409,394 B2 | 8/2008 | Lee | |
| 9,514,324 B1 | 12/2016 | Potlapally | |
| 9,641,503 B2 | 5/2017 | Mehta | |
| 11,271,815 B1 | 3/2022 | Terkowitz et al. | |
| 2003/0182401 A1 | 9/2003 | Moriya | |
| 2005/0289447 A1 | 12/2005 | Hadley | |
| 2012/0254927 A1 | 10/2012 | Kim et al. | |
| 2012/0262754 A1 | 10/2012 | Hwang | |
| 2015/0356102 A1 | 12/2015 | Cohen et al. | |
| 2016/0099896 A1* | 4/2016 | Huang | H04L 67/1097 709/206 |
| 2016/0140765 A1 | 5/2016 | Saklatvala | |
| 2016/0337426 A1* | 11/2016 | Shribman | H04L 65/612 |

\* cited by examiner

*Primary Examiner* — Hua Fan
(74) *Attorney, Agent, or Firm* — Robert C. Kowert; Kowert, Hood, Munyon, Rankin & Goetzel, P.C.

(57) ABSTRACT

A system for providing a mapping service for distributed data storage systems includes a plurality of computing devices configured to implement a service provider network. The service provider network includes a plurality of endpoints corresponding to a plurality of data servers. Each data server of the plurality of data servers is configured to receive, from a client, a request for client data stored at the plurality of data servers and send, to a mapping service, a mapping request. The data server receives, from the mapping service, a list of a subset of the plurality of data servers, where each data server of the subset stores at least a portion of the client data. The data server generates a response to the client data request including a data portion and a server identifier portion and sends the generated response to the client.

19 Claims, 8 Drawing Sheets

ACCESS MANAGEMENT FOR A MULTI-ENDPOINT DATA STORE

This application is a division of U.S. patent application Ser. No. 15/621,957, filed Jun. 13, 2017, which are hereby incorporated by reference herein in its entirety.

BACKGROUND

Businesses and other entities operate across multiple regions. Some of these businesses operate on a global scale requiring at least some of their business-related data stored in multiple locations of a provider network. For example, businesses may store some data in one data server in a home region, such as the United States, and some data may be stored in another data server in a foreign region, such as Europe.

In some situations, the data server of the home region responds to a request from the business or client for all data related to that business or client. The data server of the home region may provide any locally stored data to the client. The data server of the home region may also retrieve any additional data stored at other data servers in foreign regions on behalf of the client.

The client may also retrieve their data by manually accessing each data server on an individual basis. In order to access each data server, the client must maintain its own list of which data servers host respective portions of the data. The client may not be properly updated as to any changes to their list of data servers, such as when particular data servers are deactivated or otherwise moved.

Over time, the provider network may activate additional data servers to split an existing data server or consolidate data servers. For example, a Europe-based data server can be split between eastern and western Europe to reduce the demand to the previously consolidated data server. In another example, a Japan-based data server can be merged with a Korean-based data server to save on costs associated with running on two underutilized data servers. The client may not necessarily be aware that configuration of the data servers has changed, so the client may not be able to access all of their data in a timely manner.

Figure 1:
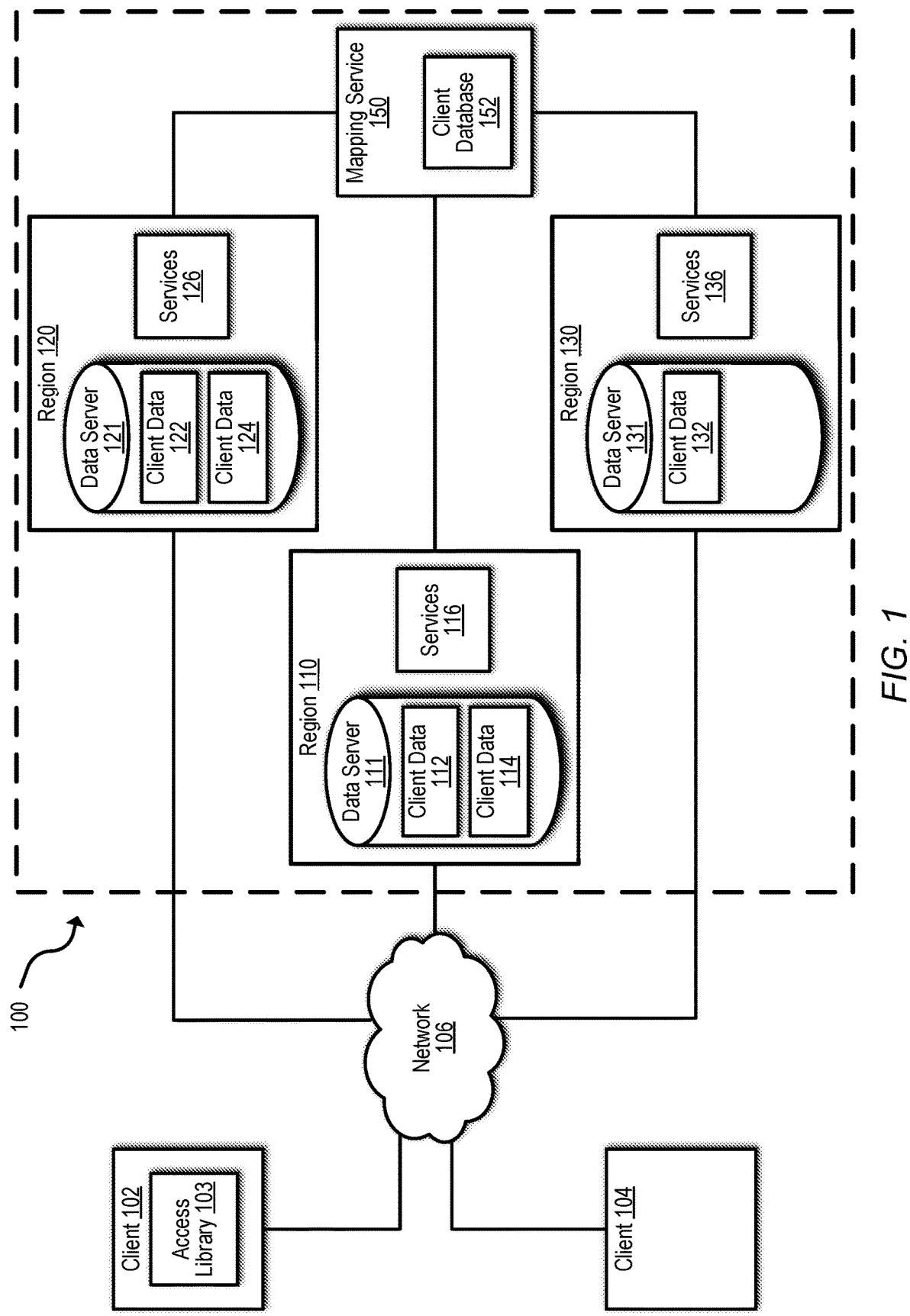
FIG. 1 illustrates a system diagram depicting a service provider network system having multiple endpoints and multiple data servers configured to access to a mapping service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of systems and processes that manage access to a multiple-endpoint data store. In some aspects, a system to manage access to a multiple-endpoint data store is disclosed. The system includes a plurality of computing devices configured to implement a service provider network. A subset of the plurality of computing devices are configured to implement a plurality of data servers for a plurality of endpoints of the service provider network. One or more computing devices of the plurality of computing devices are configured to implement a mapping service. Each data server of the plurality of data servers is configured to receive, from a client, a request for client data stored at the plurality of data servers. Each data server is also configured to send, to the mapping service, a mapping request including a client identifier corresponding to the client requesting the client data and receive, from the mapping service, a list of a subset of the plurality of data servers, where each data server of the subset stores at least a portion of the client data. Each data server is further configured to generate a response to the client data request, where the response comprises a data portion and a server identifier portion, where the server identifier portion comprises one or more identifiers of one or more other data servers of the subset of the plurality of data servers. Each data server is further configured to send, to the client, the generated response. The mapping service is configured to receive, from a particular data server, the client identifier and generate the list of the subset based on the client identifier. The mapping service is also configured to send, to the particular data server, the list of the subset.

In another aspect, a method for a data server to identify other data servers that store client data is disclosed. A data server may receive, from a client, a client data request for client data, where the client data is stored at a subset of data servers of a plurality of data servers included in a service provider network. The data server may send, to a mapping service, a mapping request to identify the subset of the plurality of data servers. The data server may also receive, from the mapping service, a list of the subset of data servers including one or more identifiers corresponding to one or more endpoints for the subset of the data servers. The data server may generate a response to the client data request including a data portion and a server identifier portion, where the server identifier portion includes the one or more identifiers. The data server may send, to the client, the generated response.

In yet another aspect, a computer-readable storage medium is disclosed. The computer-readable storage medium stores instructions that, when executed by one or more processors, cause the one or more processors to implement an access library for a client. The access library causes the client to send, to a first endpoint of a plurality of endpoints for a service provider network, a client data request for client data. The client data is stored in a subset of a plurality of data servers, and the plurality of data servers includes a first data server corresponding to the first endpoint. The client may also receive, from the first data server, a response to the client data request comprising a data portion and an endpoint identifier portion. The endpoint identifier portion includes one or more identifiers to one or more other endpoints of the plurality of endpoints. The client may also identify the one or more other endpoints as having one or more other data servers that store at least some portion of the client data based on the one or more identifiers. The client may access the one or more other endpoints based on the identifiers and retrieve, from one or more data servers associated with the one or more other endpoints, additional client data.

FIG. 1 is a system diagram depicting a service provider system 100 having multiple clients (e.g., a client 102 and a client 104) and multiple regions 110, 120 and 130. The service provider system 100 may be a part of a service provider network configured to provide one or more services to the client 102. Each of the regions 110, 120 and 130 may include an endpoint or a regional endpoint allowing outside entities (e.g., the clients 102 and 104) to access one or more functions of the service provider network 100. Each of the regions 110, 120 and 130 may include data servers 111, 121 and 131, respectively. Each of the regions 110, 120 and 130 may perform one or more services 116, 126 and 136, respectively, on behalf of the clients 102 and 104. The one or more services 116, 126 and 136 may include data storage services, cloud computing services, virtualization services, distributed networking services, content delivery services, transaction management services, or any type of network-based services.

The client 102 may connect to or access the regions 110, 120 and 130 via a network 106 to access the data servers 111, 121 and 131. In some embodiments, the client 102 may include an access library 103 that configures the client 102 to access the regions 110, 120 and 130 via the network 106. The client 104 may be configured to access the regions 110, 120 and 130 via the network 106 without using an access library. In some embodiments, the client 102 may receive the access library 103 from the service provider system 100.

In some embodiments, the service provider system 100 may be associated with an online retailer or ecommerce site, and the client 102 may correspond to a third-party seller that sells one or more products via the online retailer. The data servers 111, 121 and 131 may store client data corresponding to sales data, order status data, financial data, statement data, inventory data, traffic data, metrics data, or any combination thereof. In other embodiments, the service provider system 100 may be configured to store data on behalf of clients as an offsite or cloud storage system.

Each of the data servers 111, 121 and 131 may store at least a respective portion of client data for the client 102 or the client 104. For example, the data server 111 may store client data 112 that corresponds to the client 102. The data server 111 may also store client data 114 that corresponds to the client 104. The data server 121 may store client data 122 that corresponds to the client 102. The data server 121 may also store client data 124 that corresponds to the client 104. The data server 131 may store client data 132 that corresponds to the client 102, whereas the client 104 may not have client data stored at the data server 131. Although three regions and three data servers are illustrated, more or fewer regions and data servers may be deployed or operated in the service provider system 100.

In some embodiments, the data servers 111, 121 and 131 may be co-located while having different endpoints to access each of the data servers 111, 121 and 131. In some embodiments, the regions 110, 120 and 130 may be logical partitions of portions of the service provider network 100. In other embodiments, the data servers 111, 121 and 131 may be physically located in multiple physical locations in different geographic regions. For example, the data server 111 may be located in the United States, the data server 121 may be located in the United Kingdom, and the data server 131 may be located in Japan. In some embodiments, the client 102 may be located in a particular geographic region that hosts a particular data server of the data servers 111, 121 and 131. For example, the client 102 may be located in the United States. The client 102 may access a corresponding regional endpoint or a data server corresponding to the particular geographic region where the client 102 resides. As an illustrative example, the client 102 and the data server 111 may both reside in the same particular geographic region such that the data server 111 may be designated or referred to as the "home data server" for the client 102. The region 110 may be designated or referred to as a "home region" for the client 102. Thus, the client 102 may send requests for the client data to its respective home data server (e.g., the data server 111) via its respective home region (e.g., the region 110). The data server 111 may store a first portion of the client data as the client data 112, whereas foreign data servers or foreign regions (e.g., the data servers 121 and 131) may store additional portions of the client data, such as the client data 122 and the client data 132.

In some embodiments, the data server 111 may access a mapping service 150 to identify which, if any, of the data servers 121 and 131 may host or store respective portions of the requested client data, such as the client data 122, 124 or 132. In some embodiments, the mapping service 150 may be implemented on one or more computing devices as part of the service provider system 100. The mapping service 150 may be hosted or located in a particular location and accessible by each of the data servers 111, 121 and 131 without regard to their respective regions 110, 120 and 130 or their respective geographic regions. In other embodiments, the mapping service 150 may be executed or implemented in each respective geographic region such that each of the data server 111, 121 and 131 may host respective copies of the mapping service 150. For example, the services 116, 126 and 136 may host the respective copies of the mapping service 150 allowing the respective data servers 111, 121 and 131 to access local, respective copies of the mapping service 150.

Although the mapping service 150 may be referred to as a service, the mapping service 150 may correspond to a local configuration file, local cache, executable code or algorithm executed at the regions 110, 120 or 130 configured to map the clients 102 and 104 to respective regions that store some portion of their respective client data. In some embodiments, the mapping service 150 may include a mapping configuration file configured to identify the clients 102 and 104. The mapping configuration file may be stored at the data servers 111, 121 and 131. The data servers 111, 121 and 131 may locally access the mapping configuration file to determine a mapping of the clients 102 and 104 to other data servers that store at least a portion of the client data.

The mapping service 150 may maintain, host or store a client database 152. The client database 152 may include a plurality of records having records corresponding to a plurality of clients including the client 102 and the client 104. For example, a record corresponding to the client 102 may indicate that the client 102 has client data stored at the data servers 111, 121 and 131. As another example, a record corresponding to the client 104 may indicate that the client 104 has client data stored at the data servers 111 and 121. The client records of the client database 152 may also be structured based on a plurality of client identifiers. In another embodiment, the record corresponding to the client 102 may indicate that the client 102 utilizes services associated with the regions 110, 120 and 130. The record corresponding to the client 104 may indicate that the client 104 utilizes services associated with the regions 110 and 120.

In some embodiments, the client database 152 may have copies stored locally at the data servers 111, 121 and 131. The data servers 111, 121 and 131 may search the locally stored copies of the client database 152 based on the client that is requesting client data such that no remote invocation to the mapping service 150 is necessary. For example, the data servers 111, 121 and 131 may request locally stored information from the local copies of the client database 152 without invoking any remote services.

The client database 152 is maintained to reflect changes to the plurality of data servers. In some embodiments, two or more data servers of the plurality of data servers may be migrated or merged such that at least one of the two or more data servers will become deactivated or inaccessible. The mapping service 150 may be configured to update the client database 152 to indicate that client data stored at the at least one deactivated data server is no longer accessible. For example, the data server 131 may be merged with the data server 121 based on one of many factors including, but not limited to, legal restrictions, logistical optimization, general improvements to accessibility, etc. Because the mapping service 150 manages the client database 152, the clients 102 and 104 do not need to manage or maintain a list of which data servers store their respective client data.

In some embodiments, the client database 152 may be updated to indicate that a new client is to be added. The mapping service 150 may generate a new client record corresponding to the new client that indicates which of the data servers 111, 121 or 131 may store at least some portion of client data for the new client.

In some embodiments, the client 102 may access the region 110 and send a client data request to the data server 111 via the network 106 and. The data server 111 may send a mapping request to the mapping service 150 indicating that the client 102 is requesting the client data. The mapping service 150 may parse or search the client database 152 with an identifier of the client 102 to determine that the client 102 utilizes or stores some client data on the data servers 111, 121 and 131. The mapping service 150 may generate a list of data servers indicating the data servers 111, 121 and 131. The list of data servers may include server identifiers for the data servers that store at least some portion of the requested client data. In some embodiments, the server identifiers may include a short form string identifying a geographic region corresponding to where the data server is hosted. For example, the server identifiers may indicate "UK" indicating that the data server is hosted in the United Kingdom. In other embodiments, the server identifiers may include an alphanumeric string that uniquely identifies a particular data server. For example, the server identifier may include a media access control (MAC) address or a serial number that is unique to the particular data server.

The mapping service 150 may provide the list of data servers to the data server 111 as a response to the mapping request. The data server 111 may parse the list of data servers to generate a response to the request for the client data. The response may include a data portion and an endpoint information portion. In some embodiments, the data portion may include the client data 112 based on a determination that the data server 111 stores a portion of the requested client data. In some embodiments, the endpoint information portion may include the list of data servers provided by the mapping service 150. In other embodiments, the data server 111 may generate a list of links to the other data servers that store at least some portion of the requested client data. The list of links may be included as part of the endpoint information portion. For example, the data server 111 may determine links to the other data servers based on the list of data servers and corresponding server identifiers to allow the client 102 to access the data server 121 via the endpoint associated with the region 120 and to access the data server 131 via the endpoint associated with the region 130. In some embodiments, the link may include a uniform resource locator (URL) address. In other embodiments, the link may include an Internet protocol (IP) address. The link may include one or more arguments or flags that indicate that requests placed to the data server 121 or the data server 131 are secondary requests for the client data in order to prevent the data server 121 or the data server 131 from sending redundant mapping requests to the mapping service 150.

The data server 111 may send the response including the data portion and the endpoint information portion to the client 102. In some embodiments, the response may include the client data 112 and the list of links to the other data servers. The client 102 may parse the list of links to retrieve links to the data server 121 and the data server 131. In some embodiments, the access library 103 may be configured to access the regions 120 and 130 automatically in response to receiving the list of links to the other data servers. In other embodiments, the list of links to the other data servers may include the server identifiers, and the access library 103 may generate links to the other data servers based on the server identifiers. In some embodiments, the endpoint information portion may include identifiers of the regions 120 and 130 such that the client 102 may generate links to the endpoints associated with the regions 120 and 130 based on the identifiers.

The client 102 may access the endpoint for the region 120 via the link to the data server 121 to request and retrieve the client data 122. The client 102 may access the endpoint for the region 130 via the link to the data server 131 to request and retrieve the client data 132. The requests to the regions 120 and 130 may be considered secondary requests based on the request for the client data originally sent to the region 110. The data servers 121 and 131 may determine that any requests received are secondary requests based on one or more flags in the requests indicating that an original request was not sent to the regions 120 and 130. Based on a determination that the requests are secondary requests, the data servers 121 and 131 may return the client data 122 and 132 without sending additional mapping requests to the mapping service 150 to prevent additional recursive iterations of the request for the client data.

Figure 2:
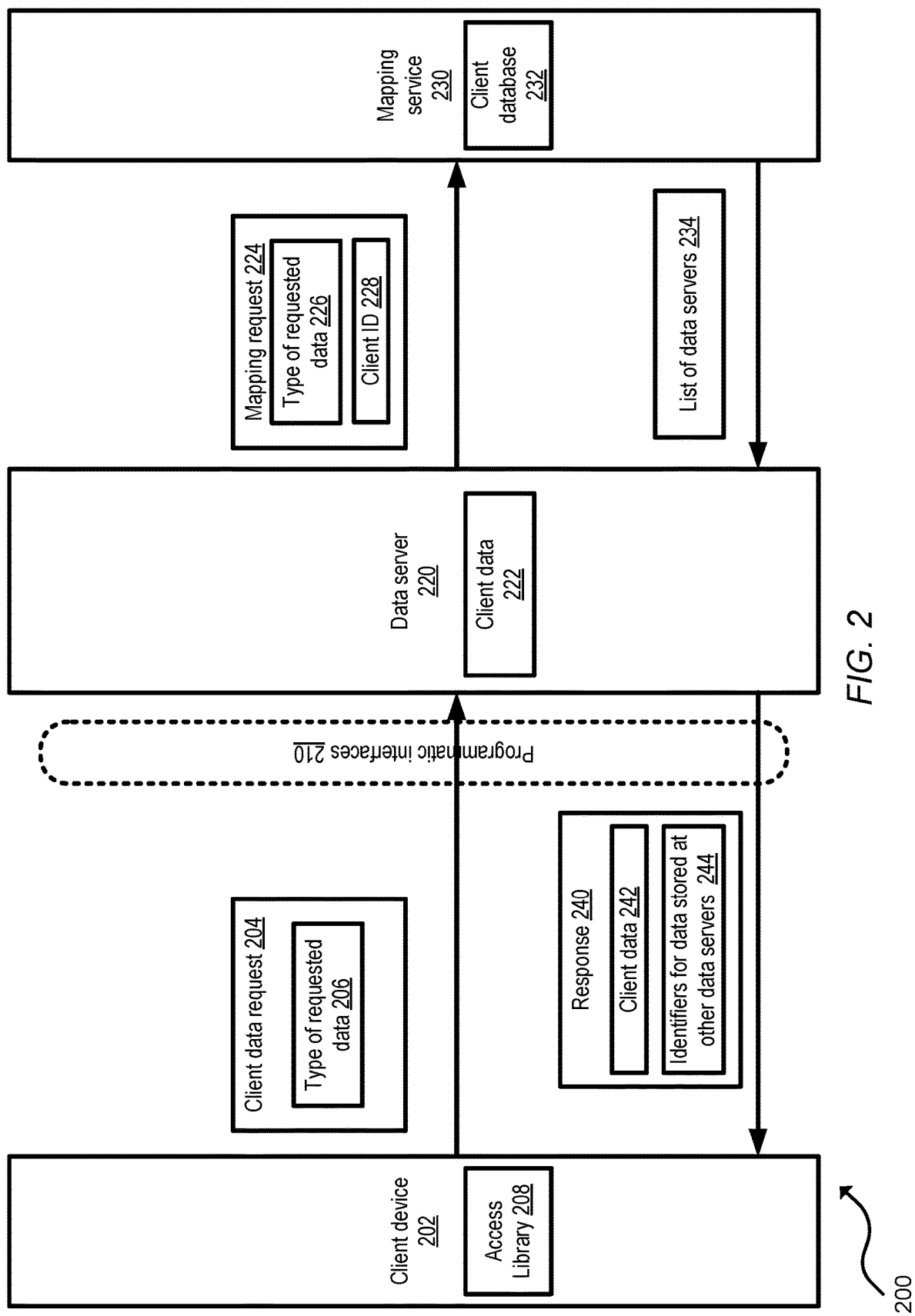
FIG. 2 illustrates example programmatic interactions of a client with a data server configured to access the mapping service, according to at least some embodiments.

FIG. 2 illustrates example programmatic interactions of a client device 202 with a service provider network having a local data server 220 and a mapping service 230, according to at least some embodiments. The service provider network may implement one or more programmatic interfaces 210, such as a set of application programmatic interfaces (APIs), a web-based console, command line tools and/or a graphical user interface.

The client device 202 may correspond to the client 102 of FIG. 1. The client device 202 may generate a client data request 204 for client data stored at one or more data servers of the service provider network. The client data request 204 may include an indication of a type of requested data 206. For example, the type of requested data 206 may correspond to a specific type of data that the client device 202 is requesting at a particular time. The client data request 204 may conform to a particular API for the programmatic interfaces 210 of the local data server 220. In some embodiments, the client device 202 may access the data server 220 via an endpoint for a particular region of the service provider network. In other embodiments, the client data request 204 may be configured to request data from only one server without retrieving any additional data from other data servers.

The data server 220 may receive the client data request 204 via the programmatic interfaces 210. The data server 220 may store at least a portion of the requested client data as client data 222. At least a subset of the client data 222 may correspond to the type of requested data 206. The data server 220 may generate a mapping request 224 including a type of requested data 226 and a client identifier 228. The type of requested data 226 may correspond to the type of requested data 206. The client identifier 228 may identify the client device 202 or a client associated with the client device 202. The data server 220 may send the mapping request 224 to the mapping service 230 in order to identify other data servers that may host at least some portion of the requested client data.

The mapping service 230 may include maintain, host or store a client database 232. The client database 232 may include a plurality of records having records corresponding to a plurality of clients including the client corresponding to the client device 202 that is identified by the client identifier 228. For example, a record corresponding to the client may indicate that the client has client data that corresponds to the type of requested data 226 stored at a subset of data servers of the plurality of data servers. In another embodiment, the record corresponding to the client may indicate that the client utilizes services associated with a subset of endpoints of a plurality of endpoints of the service provider network.

In response to the mapping request 224, the mapping service 230 may parse or search the client database 232 with the client identifier 228 to determine that the client utilizes or stores some client data on the subset of data servers. The mapping service 230 may generate a list of data servers 234 indicating the subset of data servers. The list of data servers 234 may include server identifiers of the subset of data servers. In some embodiments, the server identifiers may include a short form string identifying a geographic region corresponding to where the data server is hosted. For example, the server identifiers may indicate "UK" indicating that the data server is hosted in the United Kingdom. In other embodiments, the server identifiers may include an alphanumeric string that uniquely identifies a particular data server. For example, the server identifier may include a MAC address or a serial number that is unique to the particular data server.

The mapping service 230 may maintain the client database 232 for changes to the plurality of data servers. One or more data servers of the plurality of data servers may change over time. For example, data servers may be added to the plurality data servers, such as deploying the data servers to increase a number of the plurality of data servers for the service provider network. In another example, two or more data servers may be merged to reduce the number of the plurality of data servers. The data servers may be merged in order to reduce overhead for operating underutilized data servers. In yet another example, regional laws may affect deployment of data servers, such as geographic limitations or operational size requirements. In response to any changes to the plurality of data servers, the mapping service 230 may update the client database 232 to indicate that the client stores client data on one or more data servers, which may be different. For example, the client database 232 may indicate the client data is accessible at another subset of the plurality of data servers. The mapping service 230 may send the list of data servers 234 as a response to the mapping request 224.

The data server 220 may parse and analyze the list of data servers 234. In some embodiments, the data server 220 may generate identifiers 244 to the requested data that is stored at the subset of data servers. The data server 220 may generate the endpoint identifiers 244 based on the server identifiers included in the list of data servers 234. For example, the list of data servers may indicate a particular server identifier corresponding to a particular data server. In some embodiments, the data server 220 may generate a particular link based on the particular server identifier by modifying an existing generic string or address. For example, a generic URL address may include server.com/data as a link to retrieve data at server.com such that a modified URL address may include server.co.uk/data based on the particular server identifier corresponding to a United Kingdom data server or endpoint. In other examples, a generic IP address may include 192.168.1.x such that a modified IP address may include 192.168.1.10 based on the particular server identifier. The data server 220 may further modify the particular link based on the type of requested data 206 by including one or more flags corresponding to or indicating type of requested data 206. For example, a generic URL address may include server.com/data?type=X such that a modified URL address may include server.com/data?type=incomplete to indicate a request for data having an "incomplete" status or type. The data server 220 may further modify the particular link to include one or more flags that indicate that subsequent client data requests based on the identifiers 244 are considered secondary requests. Other data servers may determine that requests are secondary requests based on the one or more flags in order to refrain from sending additional mapping requests to the mapping service 230 to avoid repeated iterations and redundant calls to the mapping service 230.

The data server 220 may generate a response 240 to the client data request 204. The response 240 may include client data 242 that corresponds to a subset of the client data 222 that matches or corresponds to the type of requested data 206. In some embodiments, the data server 220 may not store the client data 222 locally, such as when the data server 220 has migrated the client data 222 to another server or if the client 202 does not store the client data 222 at the data server 220. The client data 242 may indicate that no client data was stored at the data server 220. Alternatively, the client data 242 may include a zero or null data set.

The response 240 may also include the identifiers 244 to the data stored at the subset of data servers. In some embodiments, the client data request 204 may indicate that the client device 202 only requests data stored at the data server 220. The identifiers 244 of the response 240 may include information indicating that no other identifiers are included. Alternatively, the identifiers 144 may include a zero or null data set.

The client device 202 may receive the response 240 via the programmatic interfaces 210. In some embodiments, the client device 202 may include an access library 208 that configures the client device 202 to retrieve the requested client data based on the links 244. The client device 202 may generate additional client data requests based on the identifiers 244. In some embodiments the access library 208 automatically traverses each of the identifiers 244 via one or more links in response to receiving the response 240. In other embodiments, the client device 202 may manually access each of the identifiers 244 in an as-needed or on-demand manner. In some embodiments, the additional client data requests may include additional flags indicating that the additional data servers should not request information regarding other servers from the mapping service 230. For example, the additional client data requests may include a flag in a link to indicate that the request is to be considered a secondary request by the other data servers.

Figure 3:
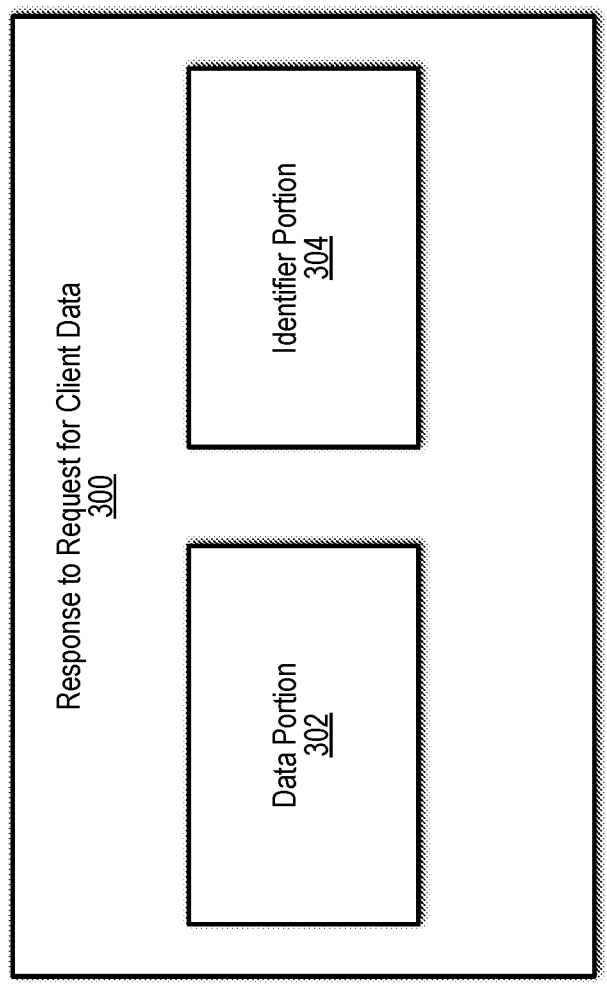
FIG. 3 illustrates an example of data returned as a response from the data server, according to at least some embodiments.

FIG. 3 illustrates a response 300 from a data server generated in response to a client data request sent by a client to a data server. The response 300 may take one of any number of data formats including, but not limited to, comma separated values, database files, text, JavaScript Object Notation (JSON), extended markup language (XML), structured query language (SQL), hypertext preprocessor (PHP), hypertext markup language (HTML), Amazon Ion format, or any other type.

The response 300 may include a data portion 302 and an identifier portion 304. The data portion 302 may include client data stored at the data server that originally received the client data request. The identifier portion 304 may include endpoint identifiers for one or more servers that also host at least a portion of the requested client data. In some embodiments, the server identifiers may include a short form string identifying a geographic region corresponding to where the data server is hosted. For example, the server identifiers may indicate "UK" indicating that the data server is hosted in the United Kingdom. In other embodiments, the server identifiers may include an alphanumeric string that uniquely identifies a particular data server. For example, the server identifier may include a media access control (MAC) address or a serial number that is unique to the particular data server.

In some embodiments, the identifier portion 304 may also include links to the requested data. The links may be provided for endpoints corresponding to the other data servers that are separate from the data server that received the client data request. The links may include an address that is usable by the client to access the requested client data at the respective data server. For example, a link to a second data server may include resource.loc/data?type=status&id=ID2&flag=secondary. In the link, "resource.loc" indicates an address for an endpoint corresponding to Server 2, where "data" indicates that data is being requested, where "type=status" indicates that a type of data being requested corresponds to a "status" type, where "id=ID2" indicates the server identifier, and where "flag=secondary" indicates that a request using the link is a secondary request to prevent the second data server from calling the mapping service to prevent recursive or redundant data retrieval.

Figure 4:
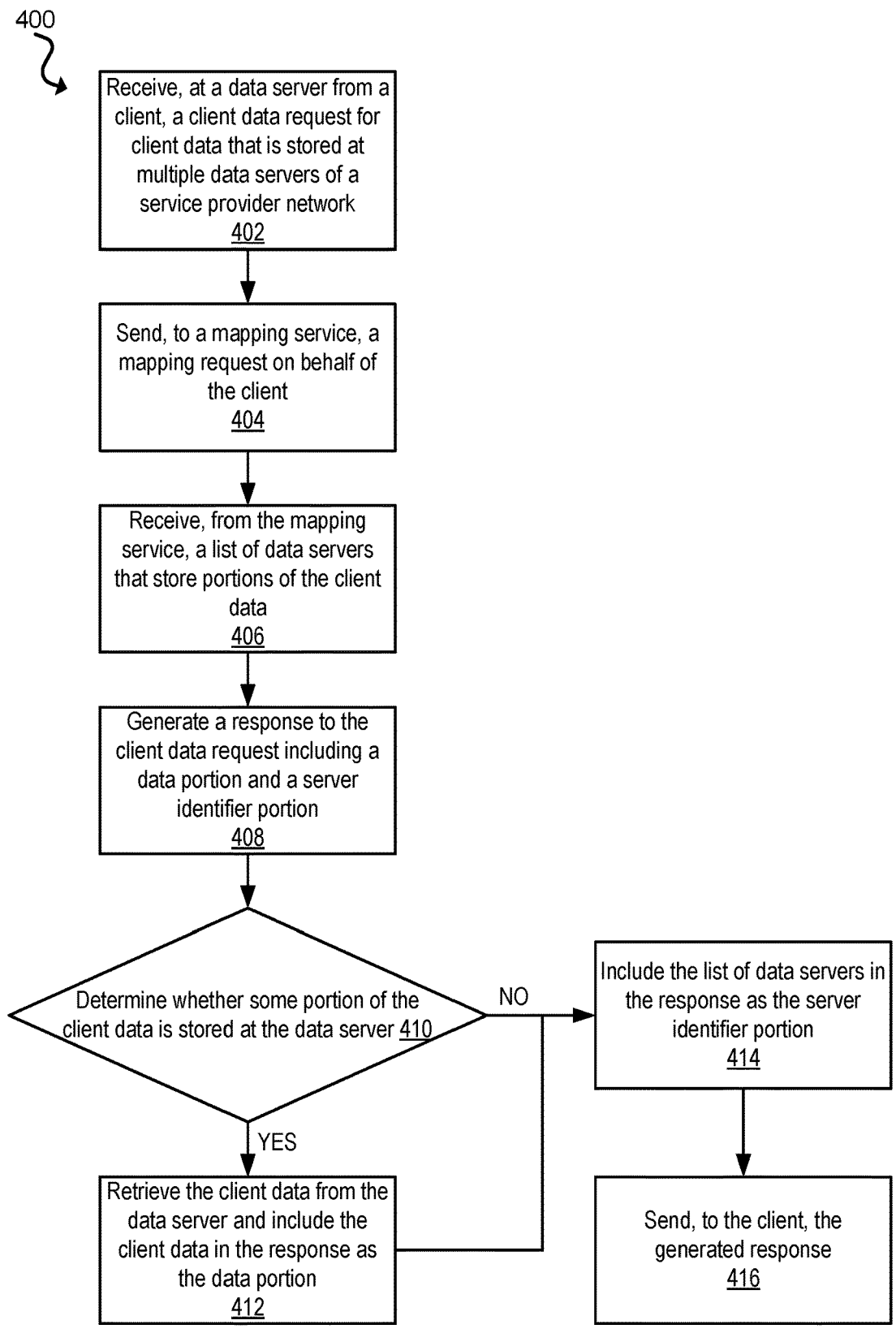
FIG. 4 is a flow diagram illustrating a method for a data server to provide a client with identifiers or links to other data servers that store client data, according to at least some embodiments.

FIG. 4 illustrates a flow chart diagram of a method 400 for a data server to provide identifiers or links to other data servers that host client data.

At 402, the method 400 includes receiving, at a data server from a client, a client data request for client data that is stored at multiple data servers of a service provider network. The client may correspond to the client 102 or the client 104 of FIG. 1 or the client 202 of FIG. 2. The data server may correspond to the data server 111 of FIG. 1 or the data server 220 of FIG. 2. The multiple data servers may include the data servers 111, 121 and 131 of FIG. 1 and the data server 220 of FIG. 2. The client data may include the client data 112, 114, 122, 124 and 132 of FIG. 1 or the client data 222 of FIG. 2.

At 404, the method 400 includes sending, to a mapping service, a mapping request on behalf of the client. The mapping service may correspond to the mapping service 150 of FIG. 1 or the mapping service 230 of FIG. 2. The mapping request may correspond to the mapping request 224 of FIG. 2. The mapping service may include a client identifier configured to identify the client that sent the client data request.

At 406, the method 400 includes receiving, from the mapping service, a list of data servers that store portions of the client data. The list of data servers may correspond to the list of data servers 234 of FIG. 2.

At 408, the method 400 includes generating a response to the client data request including a data portion and a server identifier portion. The response may correspond to the response 240 of FIG. 2 or the response 300 of FIG. 3. Initially, the data portion and the server identifier portion may include no data or otherwise indicate that no data is included such as including a zero data set.

At 410, the method 400 includes determining whether some portion of the client data is stored at the data server. In some situations, the data server that received the client data request may include some portion of the requested client data. In other situations, the data server may not include any portion of the requested client data. In response to a determination that some portion of the requested client data is stored at the data server, the method continues to 412. In response to a determination that no portions of the client data are stored at the data server, the method continues to 414.

At 412, the method 400 includes retrieving the client data from the data server, and include in the response as the data portion.

At 414, the method 400 includes including the list of data servers in the response as the server identifier portion. In some embodiments, the server identifier portion may include links to endpoints corresponding to the data servers identified in the list of data servers.

At 416, the method 400 includes send, to the client, the generated response including the data portion and the server identifier portion.

Figure 5:
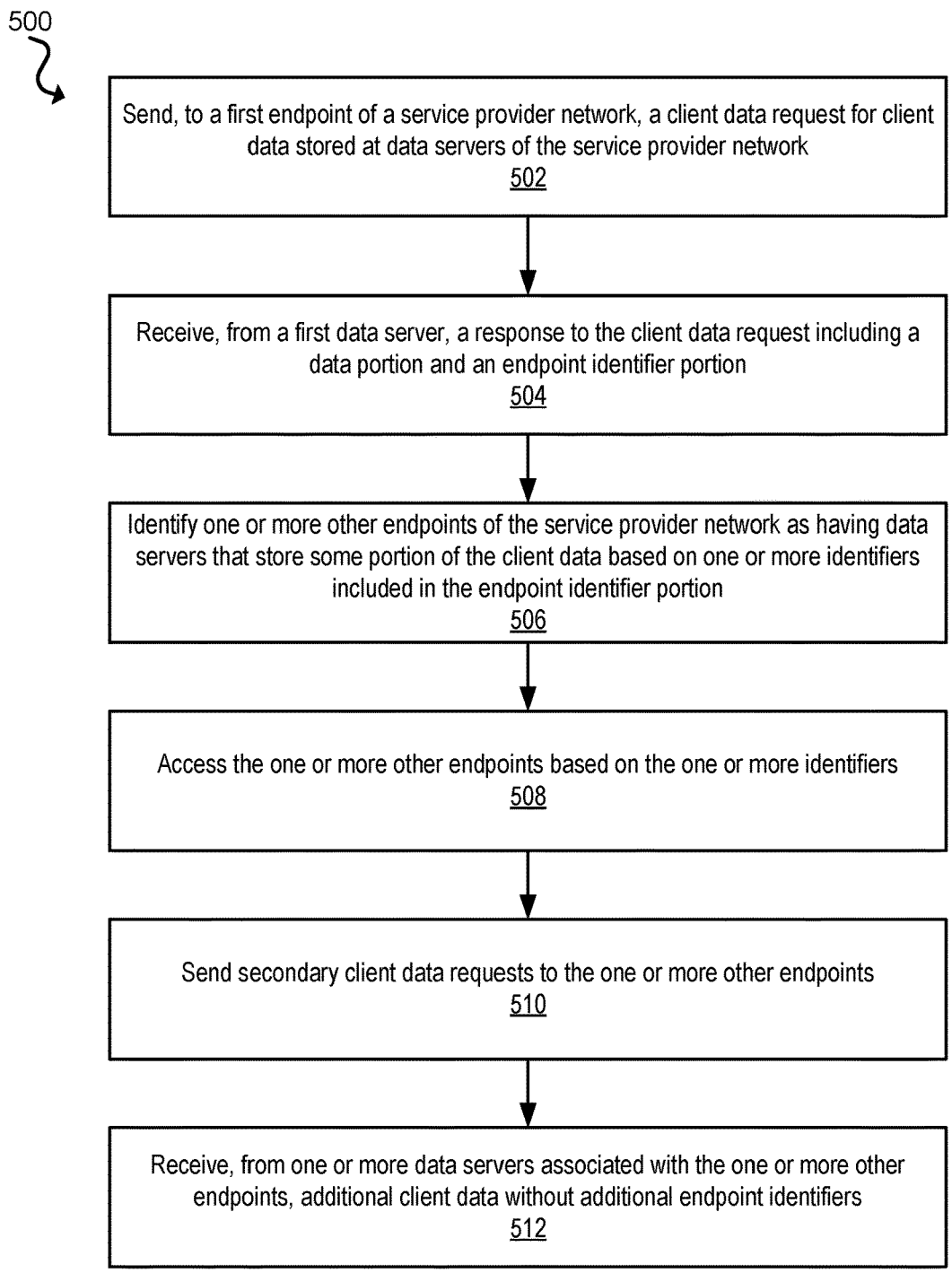
FIG. 5 is a flow diagram illustrating a method for a client to request data from a data server and retrieve additional data from other data servers, according to at least some embodiments.

FIG. 5 illustrates a flow chart diagram of a method 500 for a client to request client data from a plurality of data servers of a service provider network.

At 502, the method 500 includes sending, to a first endpoint of a service provider network, a client data request for client data stored at data servers of the service provider network. The first endpoint may include the endpoint 110 of FIG. 1. The data servers may correspond to or include the data servers 111, 121 and 131 of FIG. 1 and the data server 220 of FIG. 2.

At 504, the method 500 includes receiving, from a first data server associated with the first endpoint, a response to the client data request including a data portion and an endpoint identifier portion. The response may correspond to the response 240 of FIG. 2 or the response 300 of FIG. 3. The data portion may correspond to the client data 242 of FIG. 2 or the data portion 302 of FIG. 3. The endpoint identifier portion may correspond to the identifiers 244 of FIG. 2 or the endpoint identifier portion of FIG. 3. The data portion may include client data that was stored at the first data server. The client data stored at the first data server may correspond to the client data 112 of FIG. 1 or the client data 222 of FIG. 2. The endpoint identifier portion may include identifiers for a subset of the data servers that store at least some portion of the client data. In some embodiments, the endpoint identifier portion may include links to endpoints corresponding to the subset of the data servers.

At 506, the method 500 includes identifying one or more other endpoints of the service provider network as having data servers that store some portion of the client data based on one or more identifiers included in the endpoint identifier portion.

At 508, the method 500 includes access the one or more other endpoints based on the one or more identifiers. In some embodiments, the one or more identifiers may be included in links to the one or more other endpoints. In other embodiments, links may be generated based on the one or more identifiers after receiving the response to the client data request.

At 510, the method 500 includes sending secondary client data requests to the one or more other data servers. The secondary client data requests may include one or more flags that indicate that the secondary client data request is not an initial client data request sent to the first endpoint. The other data servers may recognize the one or more flags to prevent additional searching for additional endpoint identifiers.

At 512, the method 500 includes receiving, from one or more data servers associated with the one or more other endpoints, additional client data without additional endpoint identifiers.

Figure 6:
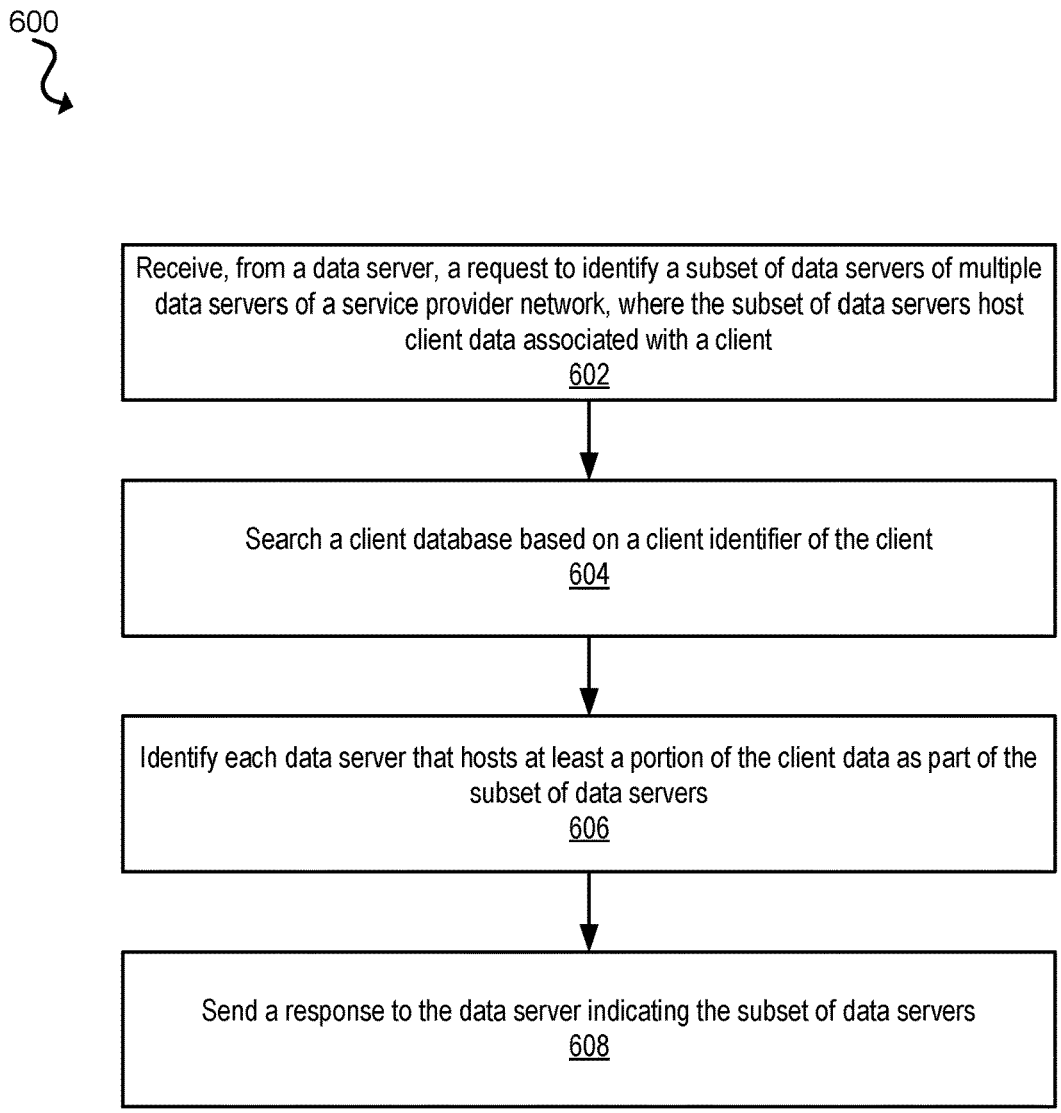
FIG. 6 is a flow diagram illustrating a method for a mapping service to determine one or more data servers that host client data, according to at least some embodiments.

FIG. 6 illustrates a flow chart diagram for a method of a mapping service determining whether a subset of data servers of a plurality of data servers stores at least some portion of client data. The mapping service may correspond to the mapping service 150 of FIG. 1 or the mapping service 230 of FIG. 2.

At 602, the method 600 includes receiving, from a data server, a request to identify a subset of data servers of multiple data servers of a service provider network, where the subset of data servers host client data associated with a client. The data server may correspond to the data server 111 of FIG. 1 or the data server 220 of FIG. 2. The subset of data servers may correspond to the data servers 121 and 131 of FIG. 1. The plurality of data servers may correspond to or include the data servers 111, 121 and 131 of FIG. 1 and the data server 220 of FIG. 2. The subset of data servers may host client data associated with a client. The client may correspond to the client 102 or the client 104 of FIG. 1 or the client 202 of FIG. 2. The client data may correspond to the client data 112, 122 or 132 of FIG. 1 or the client data 222 of FIG. 2.

At 604, the method 600 includes searching a client database based on a client identifier of the client. The client database may correspond to the client database 152 of FIG. 1 or the client database 232 of FIG. 2.

At 606, the method 600 includes identifying each data server that hosts at least a portion of the client data as part of the subset of data servers. In some embodiments, the client database may include a client record for the client that includes a list of all data servers that store at least some portion of the client data.

At 608, the method 600 includes sending a response to the data server indicating the subset of data servers that host at least a portion of the client data. The response may include the list of data servers 234 of FIG. 2.

Figure 7:
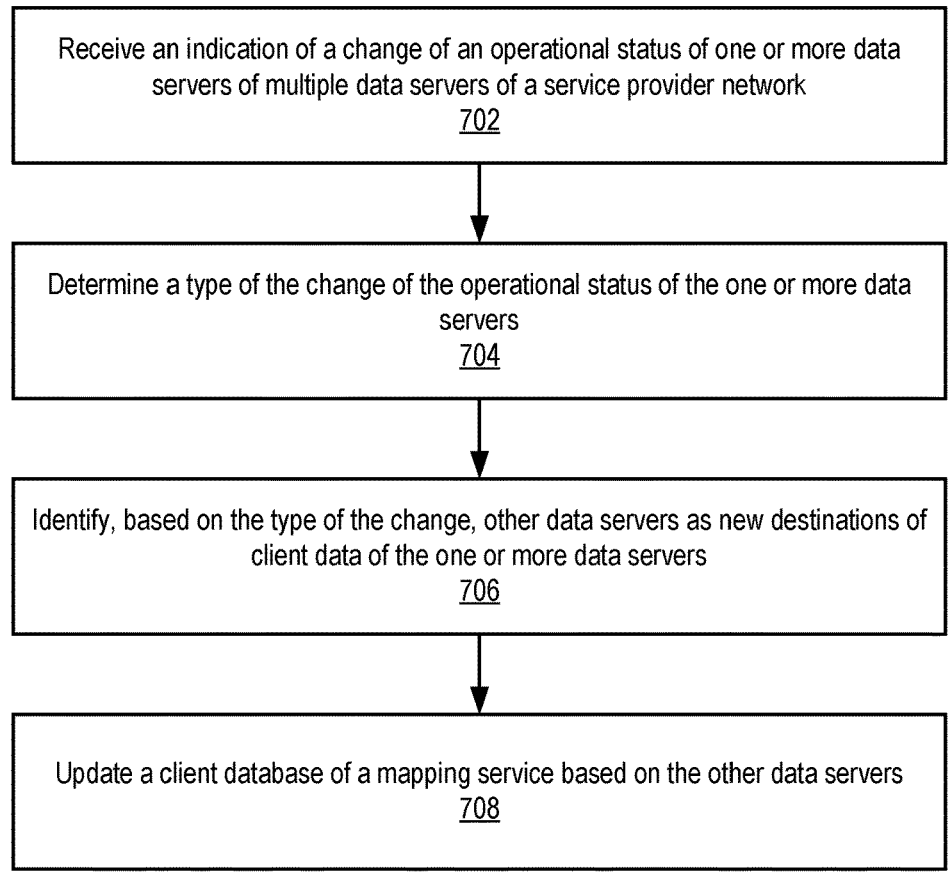
FIG. 7 is a flow diagram illustrating a method for a mapping service to update a server database based on changes to a plurality of data servers, according to at least some embodiments.

FIG. 7 illustrates a flow chart diagram for a method of a mapping service updating a client database in response to changes to at least one of multiple data servers.

At 702, the method 700 includes receiving an indication of a change of an operational status of one or more data servers of multiple data servers of a service provider network. The multiple data servers may correspond to or include the data servers 111, 121 and 131 of FIG. 1 and the data server 220 of FIG. 2.

At 704, the method 700 includes determining a type of the change of the operational status of the one or more data servers. In some situations, the type of the change may correspond to a merger of two or more data servers. In other situations, the type of the change may correspond to deployment of a new data server. In yet more situations, the type of the change may correspond to removal of a data server.

At 706, the method 700 includes identifying, based on the type of the change, other data servers as new destinations of client data of the one or more data servers. In some embodiments, client data may be moved to the other data servers as a result of the type of the change.

At 708, the method 700 includes updating a client database based on the other data servers. The client database may correspond to the client database 152 of FIG. 1 or the client database 232 of FIG. 2. In some embodiments, the client database may include client records that indicate which data servers of the multiple data servers store data for respective clients.

Figure 8:
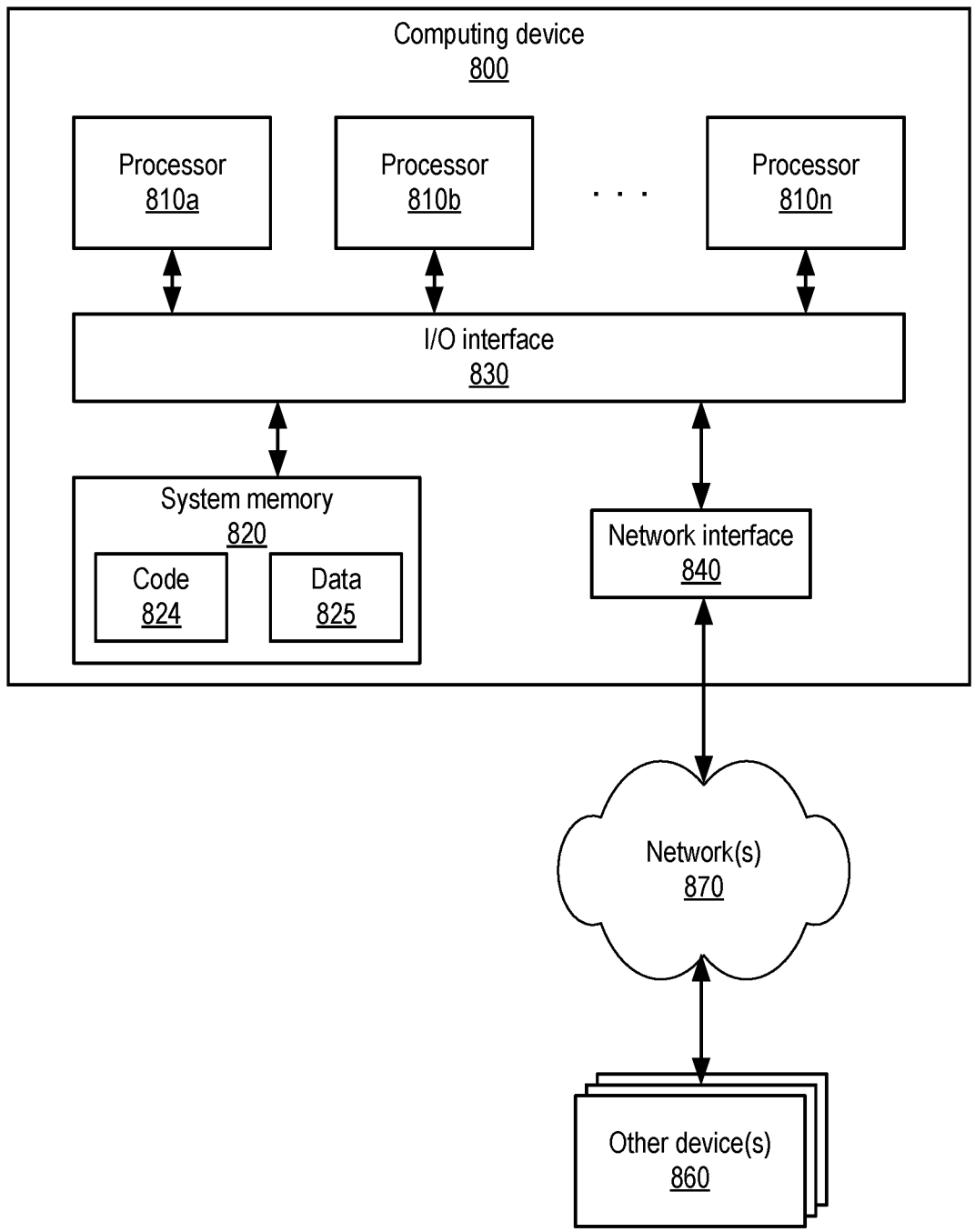
FIG. 8 is a block diagram illustrating an example computer system that may be used in some embodiments.

Any of various computer systems may be configured to implement techniques for tracking a count of a number of items in a data store, as disclosed herein. For example, FIG. 8 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 800 such as that illustrated in FIG. 8 or one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the tracking of a count of a number of items in a data store are shown stored within system memory 820 as program instructions 824. In some embodiments, system memory 820 may include data 825 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between a client devices (e.g., 860, devices of clients 102 and 104, client device 202, etc.) and other computer systems, or among hosts, for example. In particular, network interface 840 may be configured to allow communication between computer system 800 and/or various other device 860 (e.g., I/O devices). Other devices 860 may include scanning devices, display devices, input devices and/or other communication devices, as described herein. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device (e.g., cursor control device, keyboard, or display(s) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A method, comprising:
performing, by a mapping service implemented by one or more computing devices of a service provider network and including at least one memory and at least one processor:
receiving, from a data server of a plurality of data servers for a plurality of endpoints of the service provider network, a mapping request including a client identifier corresponding to a client requesting client data stored at the plurality of data servers, wherein the client data stored at the plurality of data servers is stored according to a data storage structure that is based on a plurality of client identifiers including the client identifier, wherein the client data stored at the plurality of data servers is stored in a subset of the plurality of data servers;
generating a list of the subset of the plurality of data servers in response to receiving the mapping request, wherein the list of the subset of the plurality of data servers is generated based on respective servers of the subset storing at least a portion of client data; and
sending, to the data server, the list of the subset of the plurality of data servers,
wherein, responsive to receiving the list of the subset of the plurality of data servers, the data server is configured to send a response to the client indicating a portion of the client data and respective identifiers of one or more other data servers of the subset of data servers storing respective other portions of the client data.

2. The method of claim 1, further comprising:
searching a client database based on the client identifier; and
identifying the subset of the plurality of data servers based on a client record of the client database corresponding to the client identifier.

3. The method of claim 2, further comprising:
receiving an indication of a change of an operational status of at least one data server of the plurality of data servers;
determining a type of the change of the operational status;
identifying, based on the type of the change, one or more other data servers as part of the subset of the data servers that store at least a portion of the client data; and
updating the client database based on the one or more other data servers.

4. The method of claim 3, wherein the type of the change comprises one or more of a merger of two or more data servers, a deployment of a new data server, or a removal of a data server.

5. The method of claim 2, wherein the client record indicates that the client stores the client data at the subset of data servers of the plurality of data servers.

6. The method of claim 2, further comprising:
receiving an indication of a new client that has client data stored at a second subset of data servers of the plurality of data servers;
generating a new client record indicating that the second subset of data servers; and
storing the new client record to the client database.

7. One or more non-transitory, computer-readable storage media storing instructions that, when executed on or across one or more processors, cause the one or more processors to:
in response to a mapping request received from a data server of a plurality of data servers for a plurality of endpoints of a service provider network, generate a list of a subset of the plurality of data servers, wherein the list of the subset of the plurality of data servers is generated based on respective servers of the subset storing at least a portion of client data stored according to a data storage structure that is based on a plurality of client identifiers including the client identifier, wherein the mapping request includes the client identifier corresponding to a client requesting the client data stored at the plurality of data servers according to the client identifier; and
send, to the data server, the list of the subset of the plurality of data servers,
wherein, responsive to receiving the list of the subset of the plurality of data servers, the data server is configured to send a response to the client indicating a portion of the client data and respective identifiers of one or more other data servers of the subset of data servers storing respective other portions of the client data.

8. The one or more non-transitory, computer-readable storage media of claim 7, further comprising instructions that, when executed on or across the one or more processors, cause the one or more processors to:
searching a client database based on the client identifier; and
identifying the subset of the plurality of data servers based on a client record of the client database corresponding to the client identifier.

9. The one or more non-transitory, computer-readable storage media of claim 8, further comprising instructions that, when executed on or across the one or more processors, cause the one or more processors to:
receive an indication of a change of an operational status of at least one data server of the plurality of data servers;
determine a type of the change of the operational status;
identify, based on the type of the change, one or more other data servers as part of the subset of the data servers that store at least a portion of the client data; and
update the client database based on the one or more other data servers.

10. The one or more non-transitory, computer-readable storage media of claim 9, wherein the type of the change comprises one or more of a merger of two or more data servers, a deployment of a new data server, or a removal of a data server.

11. The one or more non-transitory, computer-readable storage media of claim 8, wherein the client record indicates that the client stores the client data at the subset of data servers of the plurality of data servers.

12. The one or more non-transitory, computer-readable storage media of claim 8, further comprising instructions that, when executed on or across the one or more processors, cause the one or more processors to:

receive an indication of a new client that has client data stored at a second subset of data servers of the plurality of data servers;

generate a new client record indicating that the second subset of data servers; and store the new client record to the client database.

13. The one or more non-transitory, computer-readable storage media of claim 7, wherein the list comprises respective server identifiers for individual data servers of the subset.

14. A system, comprising:

one or more computing devices of a service provider network and including at least one memory and at least one processor, the one or more computing devices configured to implement a mapping service to:

receive, from a data server of a plurality of data servers for a plurality of endpoints of the service provider network, a mapping request including a client identifier corresponding to a client requesting client data stored at the plurality of data servers, wherein the client data is stored at the plurality of data servers according to a data storage structure that is based on a plurality of client identifiers including the client identifier, wherein the client data stored at the plurality of data servers is stored in a subset of the plurality of data servers;

generate a list of the subset of the plurality of data servers in response to receiving the mapping request, wherein the list of the subset of the plurality of data servers is generated based on respective servers of the subset storing at least a portion of client data; and send, to the data server, the list of the subset of the plurality of data servers, wherein, responsive to receiving the list of the subset of the plurality of data servers, the data server is configured to send a response to the client indicating a portion of the client data and respective identifiers of one or more other data servers of the subset of data servers storing respective other portions of the client data.

15. The system of claim 14, wherein the one or more computing devices are further configured to implement the mapping service to:

search a client database based on the client identifier; and identify the subset of the plurality of data servers based on a client record of the client database corresponding to the client identifier.

16. The system of claim 15, wherein the one or more computing devices are further configured to implement the mapping service to:

receive an indication of a change of an operational status of at least one data server of the plurality of data servers;

determine a type of the change of the operational status;

identify, based on the type of the change, one or more other data servers as part of the subset of the data servers that store at least a portion of the client data; and update the client database based on the one or more other data servers.

17. The system of claim 16, wherein the type of the change comprises one or more of a merger of two or more data servers, a deployment of a new data server, or a removal of a data server.

18. The system of claim 15, wherein the client record indicates that the client stores the client data at the subset of data servers of the plurality of data servers.

19. The system of claim 15, wherein the one or more computing devices are further configured to implement the mapping service to:

receive an indication of a new client that has client data stored at a second subset of data servers of the plurality of data servers;

generate a new client record indicating that the second subset of data servers; and store the new client record to the client database.

* * * * *